United States Patent [19]
Lauter

[11] 4,081,169
[45] Mar. 28, 1978

[54] DOUGH FRAME

[76] Inventor: Ida N. Lauter, Rte. 7, Box 329, Poplar Bluff, Mo. 63901

[21] Appl. No.: 701,989

[22] Filed: Jul. 2, 1976

[51] Int. Cl.² .......................... B29C 1/00; A21C 11/00
[52] U.S. Cl. .................................. 249/115; 269/302.1; 425/89; 425/374
[58] Field of Search .................. 425/89, 374; 249/112, 249/155, 158, 115, 102, 66; 264/337, 338; 269/302.1

[56] References Cited

U.S. PATENT DOCUMENTS

| | | | |
|---|---|---|---|
| 781,239 | 1/1905 | Stassen | 249/155 |
| 2,181,666 | 11/1939 | Molin | 425/374 X |
| 2,521,982 | 9/1950 | Kors | 425/89 |
| 2,868,145 | 1/1959 | Brooke | 425/374 X |
| 3,671,008 | 6/1972 | Villalba | 249/155 |
| 3,958,797 | 5/1976 | Brow | 269/302.1 |

*Primary Examiner*—Francis S. Husar
*Assistant Examiner*—W. R. Briggs
*Attorney, Agent, or Firm*—Koenig, Senniger, Powers and Leavitt

[57] ABSTRACT

A dough frame comprising in combination a discoid bottom plate; a first member removable thin sheet of plastic material sufficient in size to be mounted smoothly over and folded under said discoid plate; an annular rim element, having a rim height greater than the thickness of said discoid plate, the latter covered by said first member plastic sheet, and said rim element having a diameter adjusting means and supporting means cooperates with the said discoid plate covered with said first member plastic sheet to form a cavity or mold for accepting a pie dough mixture; a second member thin sheet of plastic material sufficient in size to enclose said dough within said cavity and to provide an interface between the said dough and a rolling pin and between the upper edges of the said rim element surrounding the said dough and a rolling pin.

2 Claims, 7 Drawing Figures

DOUGH FRAME

BACKGROUND OF THE INVENTION

This invention relates to mold for forming sheet material such as dough, and more particularly to a dough frame consisting of a combination of elements which enables the rolling and forming of dough to a pre-determined size and shape without flouring the working surfaces and enables the intact removal of said dough into a pie pan for baking.

A pie essentially consists of one or two layers of crust of pastry dough and a filling. The difficult aspect of pie making is in the rolling, shaping, and placing or transferring of the rolled and formed dough from the surface on which dough has been rolled onto the baking container.

Attempts have been made to facilitate the procedures of dough rolling, shaping and transferring. Rolling pins; stockinette coverings for rolling pins to minimize sticking of dough to the rolling pin; and pastry cloths and pastry boards which provide surfaces on which dough may be rolled in the conventional manner are available in retail outlets. Using those products, the conventional procedures for forming and transferring the formed dough into a pie plate is to lightly flour the surfaces of the rolling pin and the pastry cloth or board, taking care not to use too much flour since that will toughen the dough; then the dough mixture is placed on the board and rolled. During the rolling process, the dough is gently loosened and the surfaces of the board and rolling pin are floured as needed to prevent dough from sticking. Rolling is continued until the dough is approximately one-eighth inch thick and about 1½ inches wider on all sides than the inverted pie plate. The formed dough is then carefully folded in half and lifted onto an ungreased pie plate. The dough is then unfolded and centered as needed, taking care to avoid tearing or cracking the dough.

The conventional method of pie dough rolling and forming is a messy and laborious process. The rolling pin and the surface on which dough is rolled must be lightly floured not only at the beginning of the dough forming process but intermittently as the dough is formed. Hands are coated with flour. Flour dust is airborne or spread to adjacent areas and even onto the floor. In addition, if a cloth rolling pin cover and pastry cloth are used, they must be washed out in a separate operation from that of dishwashing. The conventional method requires judgement in approximating the thickness and size of the formed dough. Frequently errors in judgement occur. In the case of two crust pies, too much of the dough mixture is sometimes used for the bottom crust, leaving an insufficient amount of dough mixture for the top crust.

The conventional method of transferring the formed dough from the pastry board into the baking container requires dexterity and relative speed. In the course of folding, lifting, centering and unfolding of formed dough, the dough may break and require patching after it has been placed in the pie pan. Sometimes dough breakage is such as to require re-rolling.

Molds having rigid sides integral with base portions of one type or another have been suggested to facilitate pie dough making. Such molds, although easing the rolling and shaping of a pie dough mixture, do not allow easy intact removal of the formed dough. The nature of a pie dough mixture is such that when dough is firmly rolled and formed within an integral mold the attendant adhesive strength of the dough to the mold is greater than the cohesive strength of the dough. Hence removing the formed dough from an integral mold becomes problematical despite initial light flouring of the mold.

Simply rolling and forming dough between two thin sheets of plastic material has been tried to circumvent some of the aforementioned difficulties. Although the non-sticky characteristic of thin plastic sheets allow the sheets to be peeled away from the dough, the method is unsatisfactory since the plastic sheets together with the dough being rolled therein tend to slide and move over the counter space due to a lack of fixedness between the bottom plastic sheet and the working surface.

SUMMARY OF THE INVENTION

The overall purpose of this present invention is to provide a dough frame with means which facilitates the procedures of rolling and shaping, and transferring of the formed dough into a baking container.

A corollary purpose, discussed hereat, ensues from the general purpose. Normally formed dough is frozen after it has been transferred into the pie plate. If several pie shells are frozen at any given time, not only is a number of pie plates required but the resultant bulk takes up valuable freezer space. It would be advantageous if formed dough could be easily frozen in layers for storage and just prior to baking transferred into the pie plate.

It is therefore an object of the present invention to provide a dough frame with means which obviates the need for flouring the surface on which dough is rolled and formed.

It is another object to provide a dough frame with means which obviates the need to flour the rolling pin or its cloth covering used in rolling pie dough.

It is another object of the present invention to provide a dough frame wherein a dough mixture may be rolled to a reproducible, pre-determined size and thickness.

It is a further object of the present invention to to provide a dough frame in which dough may be rolled and formed to a pre-determinable size and thickness and from which said dough may be transferred in a unit onto a pie plate for baking.

It is another object to provide a dough frame which enables neat layering of dough for storage and later enables transferring of said layers of dough into a baking container.

It is a further object to provide a dough frame which is both functional and inexpensive. With respect to this object, the rigid portions of the dough frame would be made preferably of a non-warping, smooth, strong plastic material. Any metal parts used would be preferably of non-rusting metal.

To accomplish those objects and others as may hereinafter appear a dough frame is provided comprising a discoid bottom plate; a removable first part or bottom thin sheet of non-sticky plastic material of a size large enough to drape smoothly over the top surface and sides of the said discoid plate and extend beyond the perimeter of the said discoid plate; an annular rim element, which, having a rim height greater than the thickness of the said discoid plate and having an offset at the lower inner edge of the body of the rim and having a diameter adjusting means, cooperates with the said discoid plate, the latter being covered by the said first part or bottom thin sheet of plastic material, to form a cavity or mold for accepting dough; a removable second part or top thin sheet of plastic material of a size large enough to enclose the said dough within the said cavity and to serve thereon as an interface between the rolling pin and the upper edges of the said rim element including the dough.

The said body of the said rim element has a gap therein. The said adjustment means at the said rim element comprises a first and second part lateral extensions integral with the portion of the body situated on each side of the said gap. The parts each have an aperture therein and are adjustably positionable relative to each other by a screw and nut assembly. The screw passes through the apertures and engages with the nut situated on the exterior side of the second lateral part. The head of the screw is preferably non-circular, e.g., polygonal, and is embedded within the interior of the exterior side of the first lateral part to prevent rotation of the screw relative to the parts.

BRIEF DESCRIPTION OF THE DRAWINGS

In accordance with the present invention and the objects, specification and claims pertaining, drawings are furnished in which:

FIG. 5 is a partial plan view of means for;

Corresponding reference characters indicate corresponding parts throughout the several views of the drawings;

DESCRIPTION OF A PREFERRED EMBODIMENT

The dough frame of the present invention comprises in combination an outer rim element 10 which is annular; an inner bottom discoid 11 and a bottom or first and a top or second member thin sheets of plastic material identified respectively as 12 and 13.

Figure 1:
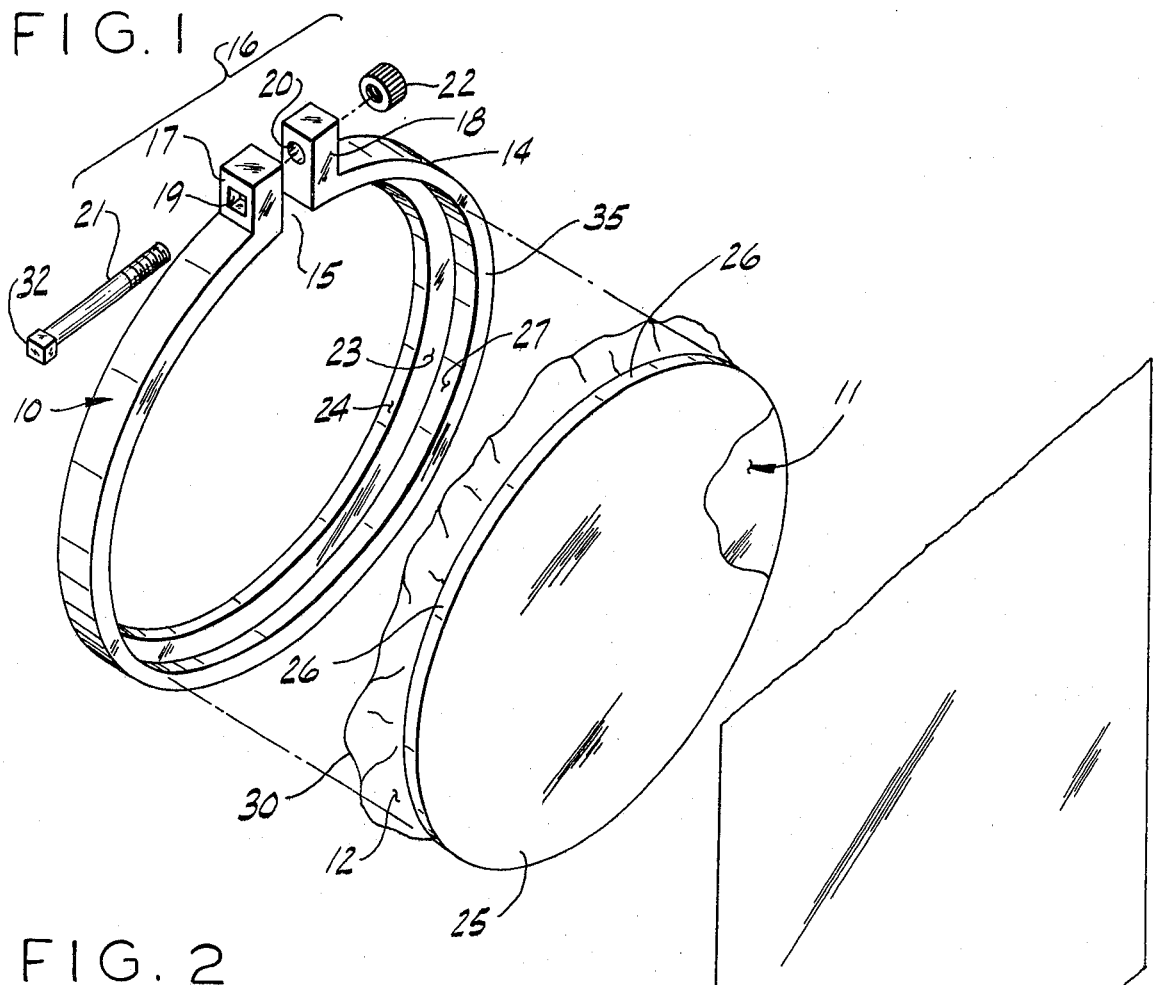
FIG. 1 is an exploded isometric view of the dough frame of this invention illustrating a discoid plate covered by a transparent sheet of thin plastic lining.

Referring to FIG. 1, the rim element 10 has a body 14 with a gap 15 therein and a diameter adjusting means generally designated as 16. Said adjustment means 16 consists of a first part 17 and second part 18 lateral extensions integral with the body 14 and one situated on each side of the gap 15. The lateral extension parts 17 and 18 have apertures 19 and 20 respectively, and are adjustably positionable relative to each other by a screw 21 and nut 22 assembly.

The body 14 of the rim element 10 has an offset 23 at the lower inner edge 24 of the rim element 10. Said offset provides support when the discoid plate 11 is inserted in the rim element 10. Said offset 23 also helps prevent distortion of the rim element 10.

Figure 2:
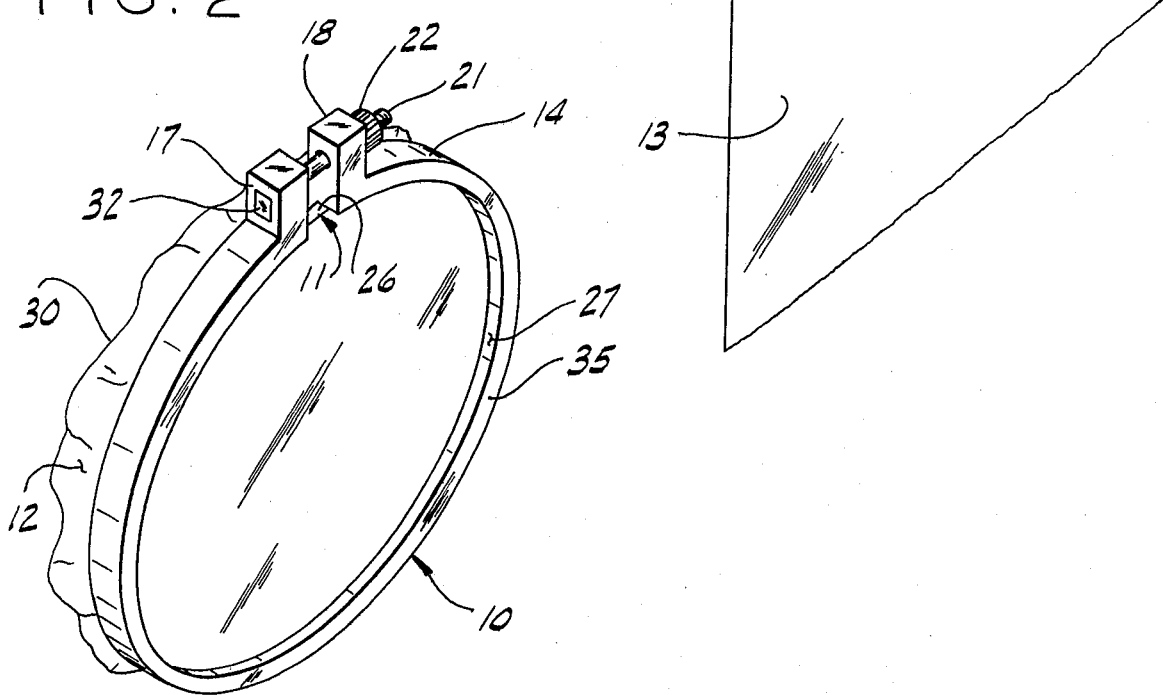
FIG. 2 is an isometric view of an assembled dough frame of this invention.
Figure 4:
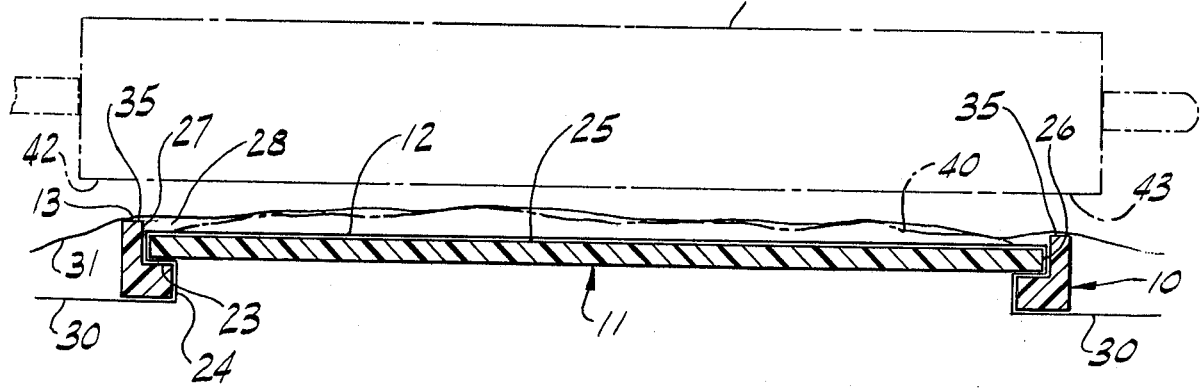
FIG. 4 is a cross-sectional view of the assembled dough frame taken along the plane represented by 4—4 in FIG. 3.

The top surface 25 and sides 26 of the discoid plate 11 in FIG. 1 are covered by a removable bottom part plastic sheet 12 which is illustrated as a transparent sheet. The diameter of the said discoid plate 11 plus the thickness of the plastic sheet 12 is such that the said discoid plate 11 covered by the said bottom part plastic sheet 12 will fit within the rim element 10. The thickness of the said discoid plate 11 plus the thickness of the thin bottom plastic sheet 12 is less than the height of the side 27 of the rim element 10 such that when the discoid plate 11 is fitted within the rim element 10, the said discoid plate serves as a bottom panel and cooperates with the rim element 10 to form a cavity 28 or mold as shown in FIG. 4. In FIG. 2 the said bottom plastic sheet 12 is interposed and held snugly between the lower inner sides of the rim element 10 and the sides 26 of the said discoid plate 11. The size of the said bottom plastic sheet 12 is large enough to have a perimetric margin 30, later used for facilitating the transfer of dough.

Figure 3:
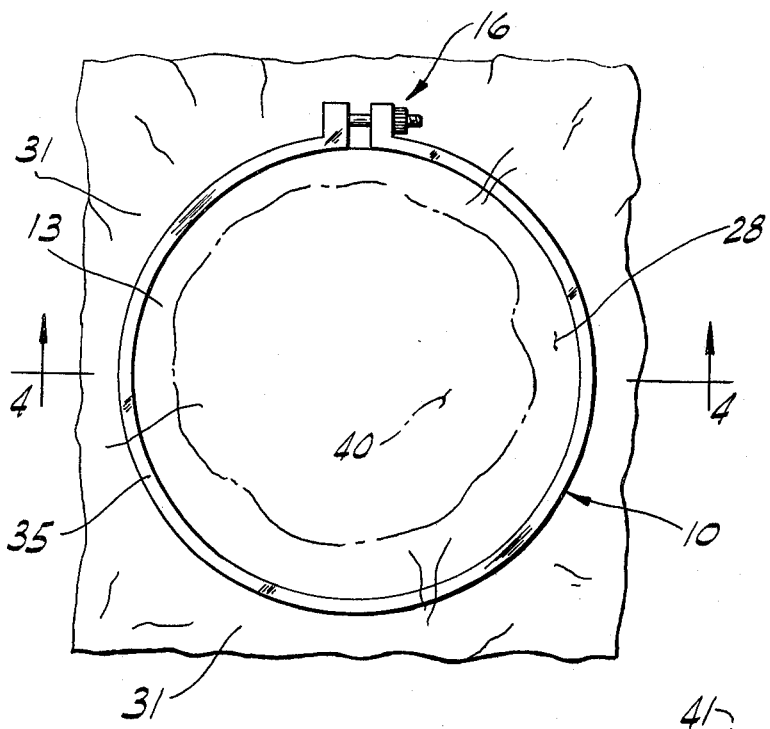
FIG. 3 is a plan view of the assembled dough frame with dough enclosed therein.

In FIG. 3 said margin 30 of the said bottom plastic sheet 12 seen in FIG. 2 is folded and hidden under the discoid plate 11. A dough mixture 40 is in the cavity 28. The removable top plastic sheet 13 is placed over the said dough 40 to enclose the said dough 40 within the said cavity 28. The size of the second part or top plastic sheet 13 is such that its perimetric margin 31 extends beyond the perimeter of the rim element 10.

FIG. 4 shows a cross-sectional view of the assembled dough frame containing dough, taken along the plane represented by 4—4 in FIG. 3. A rolling pin 41, illustrated in broken lines, is positioned over the dough frame and the dough therein. The top plastic sheet 13 intervenes between the rolling pin 41 and the dough 40 so that the dough 40 may be rolled through the said top plastic sheet 13. The said top plastic sheet 13 also intervenes between the edges 42 and 43 of the rolling pin 41 and the upper edge 35 of the rim element 10, allowing excess dough to be rolled out between the top plastic sheet 13 and the said upper edge 35 of the rim element 10, said upper edge 35 serving as a cutting edge.

Figure 5:
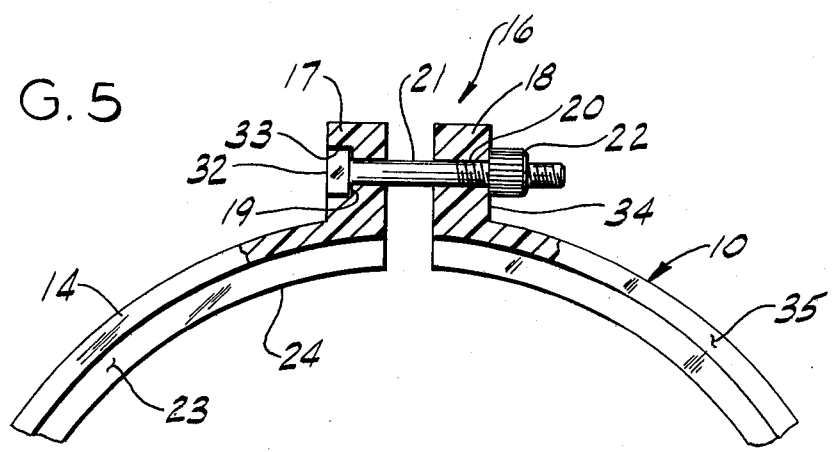

FIG. 5 shows a sectional view of the adjustment means 16 in which the screw head 32 is embedded within the exterior side 33 of the aperture 19 in the first part lateral extension 17. The screw 21 passes through the apertures 19 and 20 and engages with the nut 22 situated on the exterior side 34 of the second part lateral extension 18. The nut 22 is ridged to facilitate manual turning. The screw head 32 is rectangular and prevents rotation of the screw 21 relative to the parts.

In operation a quantity of dough mixture 40 is placed in the cavity 28 of the dough frame. Flouring of the cavity 28 is unnecessary due to the bottom lining plastic sheet 12 which is held in place by the rim element 10 and the discoid plate 11.

The top plastic sheet 13 is placed over the dough 40, enclosing said dough within the lined cavity 28. The rolling pin 41 rolls the dough through the top plastic sheet 13. Flouring of the rolling pin 41 is unnecessary due to the presence of the top plastic sheet 13.

During the rolling process the edges 42 and 43 of the rolling pin 41 are engaged with the upper edges 35 of the rim element 10, through the top plastic sheet 13. Any excess dough in the cavity is rolled out between the plastic sheet 13 and the upper edges 35 of the rim element 10, said upper edge 35 acting as a cutting edge. If additional dough is required to fill the cavity 28, the top plastic sheet 13 is peeled back to expose the cavity 28 and additional dough is placed therein, the top plastic sheet 13 is replaced thereon and rolling is resumed. When all spaces in the cavity are filled and the excess dough rolled out, dough formed to a reproducible, uniform thickness and size will be obtained. It is apparent that the construct of the dough frame provides a means for varying the configuration of the dough rolled therein by means of inserts or by changing the shape of the elements.

Figure 6A:
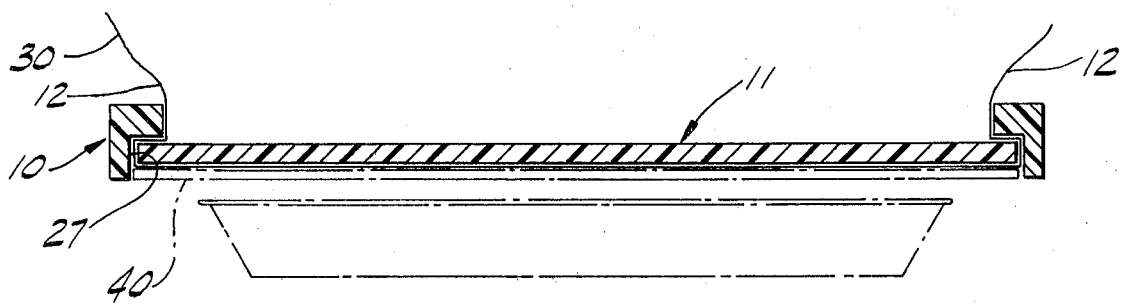
FIGS. 6A and 6B show adjusting the diameter of the rim a sequential sectional view of dough placement into a pie plate.
Figure 6B:
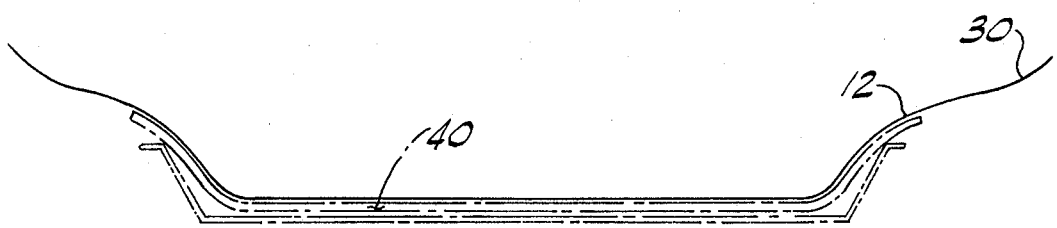

When the dough 40 has been rolled and formed, the top plastic sheet 13 is peeled off and removed. The dough frame with the dough therein is inverted directly over a pie plate, as shown in FIG. 6A. The diameter adjustment means 16 of the rim element 10 is loosened by rotating the nut 22. Slight downward pressure is exerted against the bottom surface of the discoid plate 11 to unstick the dough 40 from the upper inner rim 27 of the rim element 10 and simultaneously to urge the discoid plate 11, the bottom plastic sheet 12 and the formed dough out of the rim element 10 as a unit. Said rim element 10 is removed. The discoid plate 11 is then separated from the bottom plastic sheet and dough unit beginning with the margin 30 of the plastic sheet 12. In unit with the plastic sheet 12, the dough is guided in position into the pie plate as the discoid plate 11 is being separated from them (see FIG. 6B). The dough having been positioned in the pie plate, the plastic sheet 12 is peeled away. The dough will not be disturbed if the peeling is begun at the margin 30 of the plastic sheet 12. Thus formed dough is transferred in an intact unit.

If the formed dough is to be layered and stored for later use, the dough frame need not be inverted for removal of the formed dough. Instead, after peeling away the top plastic sheet 13, the dough frame with the dough therein is lifted in an upright position. The nut 22 is rotated to loosen the adjustment means 16 of the rim element 10 and slight upward pressure is exerted against the bottom surface of the discoid plate 11 to urge the unit of the discoid plate 11, the plastic sheet 12 and the said dough out from the rim element 10. The unit of plastic sheet 12 and dough thereon are removed from the discoid plate 11 and stored or frozen as a unit. It is evident that the said discoid plate 11, plastic sheet 12 and dough thereon may itself be stored as a unit. If several sheets of dough are made at one time, individual units of dough and plastic sheet may be stacked one atop another.

When later the stored dough is to be placed in a pie plate, the dough and the plastic sheet may be placed as a unit in the dough frame, and the dough defrosted, transferred into the pieplate as previously described.

The principles of the dough frame have been discussed with a specific embodiment for purposes of illustration. It is obvious that many variations and modifications may be made upon the specific structures and methods disclosed. It is intended to cover all of those variations and modifications which fall within the spirit and scope of this invention as defined in the subjoined claims.

I claim:

1. A dough frame in which dough, such as pie dough or the like, may be readily rolled to a predetermined uniform thickness and size, removed from the dough frame, and placed in a pie pan, said dough frame comprising an outer annular rim and a disc-like plate removably fitted within said rim, said rim having a shoulder on its inner face for engagement with the bottom face of said plate and an upper portion of said rim extending above the upper face of said plate when the latter is supported on said shoulder thereby to define a mold cavity in which said dough is to be formed, the upper edge of said rim constituting a reference surface over which a rolling pin or the like may be operated to form the dough to the shape of said cavity, a first sheet of non sticky plastic film or the like overlying the upper face of said plate and extending to be interposed between the outer circumferential face of said plate and the inner circumferential face of said rim, said upper portion of said rim extending above said film to be engaged by the dough being molded, said rim having means for adjustably tightening said rim on said plate and on said first sheet interposed therebetween thereby to securely clamp said plate and said first sheet relative to said rim and to hold said first sheet in place on the upper face of said plate as said dough is being formed in said cavity and for loosening said rim thereby to release said plate and said first sheet from said rim and to permit removal of said plate and said first sheet along with the formed dough from said rim, and a second sheet of plastic overlying said cavity and said upper edge of said rim whereby said rolling pin may be rolled on said reference surface with said second sheet disposed between said rolling pin and said dough thereby to prevent the dough from sticking to the rolling pin.

2. A dough frame as set forth in claim 1 wherein said rim is split, and wherein said tightening means comprises a threaded fastener connected to said rim on opposite sides of said split whereby upon tightening said fastener, said rim is drawn into tight clamping engagement with said plate and sheet and upon loosening said fastener, said rim is loosened relative to said plate.

* * * * *